(12) United States Patent
Cho

(10) Patent No.: US 11,428,953 B2
(45) Date of Patent: Aug. 30, 2022

(54) METHOD FOR DESIGNING SPECTACLE LENS, METHOD FOR MANUFACTURING SPECTACLE LENS, SPECTACLE LENS ORDER SENDING DEVICE, SPECTACLE LENS ORDER RECEIVING DEVICE, SPECTACLE LENS ORDER SENDING/RECEIVING SYSTEM, PROGRESSIVE POWER LENS, AND SINGLE FOCUS LENS

(71) Applicant: NIKON-ESSILOR CO., LTD., Tokyo (JP)

(72) Inventor: Sungjin Cho, Kawasaki (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 290 days.

(21) Appl. No.: 16/417,088

(22) Filed: May 20, 2019

(65) Prior Publication Data

US 2019/0271859 A1 Sep. 5, 2019

Related U.S. Application Data

(63) Continuation of application No. PCT/JP2017/040785, filed on Nov. 13, 2017.

(30) Foreign Application Priority Data

Nov. 30, 2016 (JP) .............................. JP2016-233004

(51) Int. Cl.
*G02C 7/02* (2006.01)
*G02C 7/06* (2006.01)

(52) U.S. Cl.
CPC ............. *G02C 7/024* (2013.01); *G02C 7/027* (2013.01); *G02C 7/061* (2013.01); *G02C 7/066* (2013.01)

(58) Field of Classification Search
CPC ........ G02C 7/024; G02C 7/027; G02C 7/066; G02C 7/06; G02C 7/061; G02C 2202/24
USPC ............ 351/159.06, 159.09, 149.73, 159.74, 351/159.75
See application file for complete search history.

(56) References Cited

U.S. PATENT DOCUMENTS

2001/0056338 A1* 12/2001 Qi ............................ G02C 7/02
703/6
2004/0032565 A1 2/2004 Yamakaji et al.
(Continued)

FOREIGN PATENT DOCUMENTS

CN 1340166 A 3/2002
CN 102460273 A 5/2012
(Continued)

OTHER PUBLICATIONS

Edmund Optics/Worldwide "Comparison of Optical Aberrations", Cambridge University Press, 2008.*
(Continued)

*Primary Examiner* — Jordan M Schwartz
(74) *Attorney, Agent, or Firm* — Staas & Halsey LLP

(57) ABSTRACT

A method for designing a spectacle lens includes: presenting a plurality of blurred images created by applying different degrees of blur to an original image and having a wearer see the blurred images; acquiring information on a sensitivity to blur of the wearer; and designing a spectacle lens based on the information on the sensitivity to blur of the wearer.

27 Claims, 11 Drawing Sheets

(56) References Cited

U.S. PATENT DOCUMENTS

| | | | |
|---|---|---|---|
| 2004/0105073 A1* | 6/2004 | Maddalena | A61B 3/032 351/205 |
| 2008/0309879 A1* | 12/2008 | Hirji | A61B 3/032 351/223 |
| 2011/0043754 A1 | 2/2011 | Hatanaka | |
| 2011/0157547 A1* | 6/2011 | Dillon | G02C 7/068 351/159.06 |
| 2012/0038889 A1 | 2/2012 | Drobe et al. | |
| 2012/0092614 A1 | 4/2012 | Drobe et al. | |
| 2012/0106813 A1* | 5/2012 | Drobe | A61B 5/7475 382/128 |
| 2014/0168607 A1* | 6/2014 | Qi | A61B 3/09 351/239 |
| 2015/0062535 A1* | 3/2015 | Hawke | A61B 3/04 351/222 |
| 2015/0092157 A1* | 4/2015 | Tessieres | G02C 7/028 351/159.42 |
| 2015/0168743 A1* | 6/2015 | Drobe | G02C 7/028 351/159.42 |
| 2015/0235427 A1 | 8/2015 | Nobori et al. | |
| 2016/0327808 A1* | 11/2016 | Hatanaka | G02C 7/066 |
| 2017/0220668 A1* | 8/2017 | Patton | G06F 16/489 |
| 2017/0265738 A1* | 9/2017 | Keita | A61B 3/1015 |

FOREIGN PATENT DOCUMENTS

| | | |
|---|---|---|
| CN | 102483527 A | 5/2012 |
| EP | 2 749 207 A1 | 7/2014 |
| EP | 3 006 991 A1 | 4/2016 |
| EP | 3 088 938 A1 | 11/2016 |
| JP | 2002-315725 | 10/2002 |
| JP | 2003-52633 A | 2/2003 |
| JP | 2013-217948 | 10/2013 |
| JP | 2015-194511 A | 11/2015 |
| WO | WO 2009/133887 A1 | 11/2009 |
| WO | WO2013/027755 | 2/2013 |
| WO | WO 2014/022926 * | 2/2014 |
| WO | WO 2014/203440 A1 | 12/2014 |

OTHER PUBLICATIONS

Chinese Office Action dated Aug. 17, 2020 in corresponding Chinese Patent Application No. 201780073561.6.
Chinese Office Action dated Jan. 8, 2021, in corresponding Chinese Patent Application No. 201780073561.6.
Canadian Intellectual Property Office Action dated Jun. 9, 2020 in corresponding Canadian Patent Application No. 3,044,515.
Korean Office Action dated Oct. 12, 2020, in corresponding Korean Patent Application No. 10-2019-7015372.
Extended European Search Report dated Jul. 10, 2020, in corresponding European Patent Application No. 17876641.6 (9 pages).
Translation of Office Action dated Feb. 21, 2020, in corresponding Chinese Patent Application No. 201780073561.6 (18 pages).
Korean Office Action dated Mar. 31, 2020, in Korean Patent Application No. 10-2019-7015372 (13 pages).
International Search Report dated Dec. 12, 2017 in corresponding International Patent Application No. PCT/JP2017/040785 (2 pages).
Translation by WIPO of the International Preliminary Report on Patentability dated Jun. 4, 2019 in corresponding International Patent Application No. PCT/JP2017/040785 (6 pages).
Office Action, dated Jun. 16, 2021, in Chinese Patent Application No. 201780073561.6 (20 pp.).
Office Action, dated Jun. 29, 2021, in Japanese Patent Application No. 2018-553747 (16 pp.).

* cited by examiner

DEGREE OF BLUR

FIG. 7

[LENS INFORMATION] 101

| | PRODUCT NAME | S POWER | C POWER | AXIS ANGLE | ADDITION |
|---|---|---|---|---|---|
| RIGHT | LENS A | -2.25 | -0.25 | 90 | 2.00 |
| LEFT | LENS A | -2.25 | -0.25 | 90 | 2.00 |

[PROCESSING SPECIFICATION INFORMATION] 102

| | PROCESSING SPECIFICATION | | |
|---|---|---|---|
| RIGHT | OUTER DIAMETER 60 | | |
| LEFT | OUTER DIAMETER 60 | | |

[DYEING INFORMATION] 103

| DYEING COLOR | WAY OF DYEING | DENSITY |
|---|---|---|
| COLOR A | HALF | 15% |

[FITTING POINT INFORMATION] 104

| | PD | FP |
|---|---|---|
| RIGHT | 32.5 | 2 |
| LEFT | 32.5 | 2 |

[SENSITIVITY INFORMATION] 106

| | LEVEL OF SENSITIVITY TO BLUR |
|---|---|
| LONG DISTANCE | 5 |
| SHORT DISTANCE | 4 |

[FRAME INFORMATION] 105

| MODEL NAME | FRAME TYPE | FRAME PD |
|---|---|---|
| | | |

100

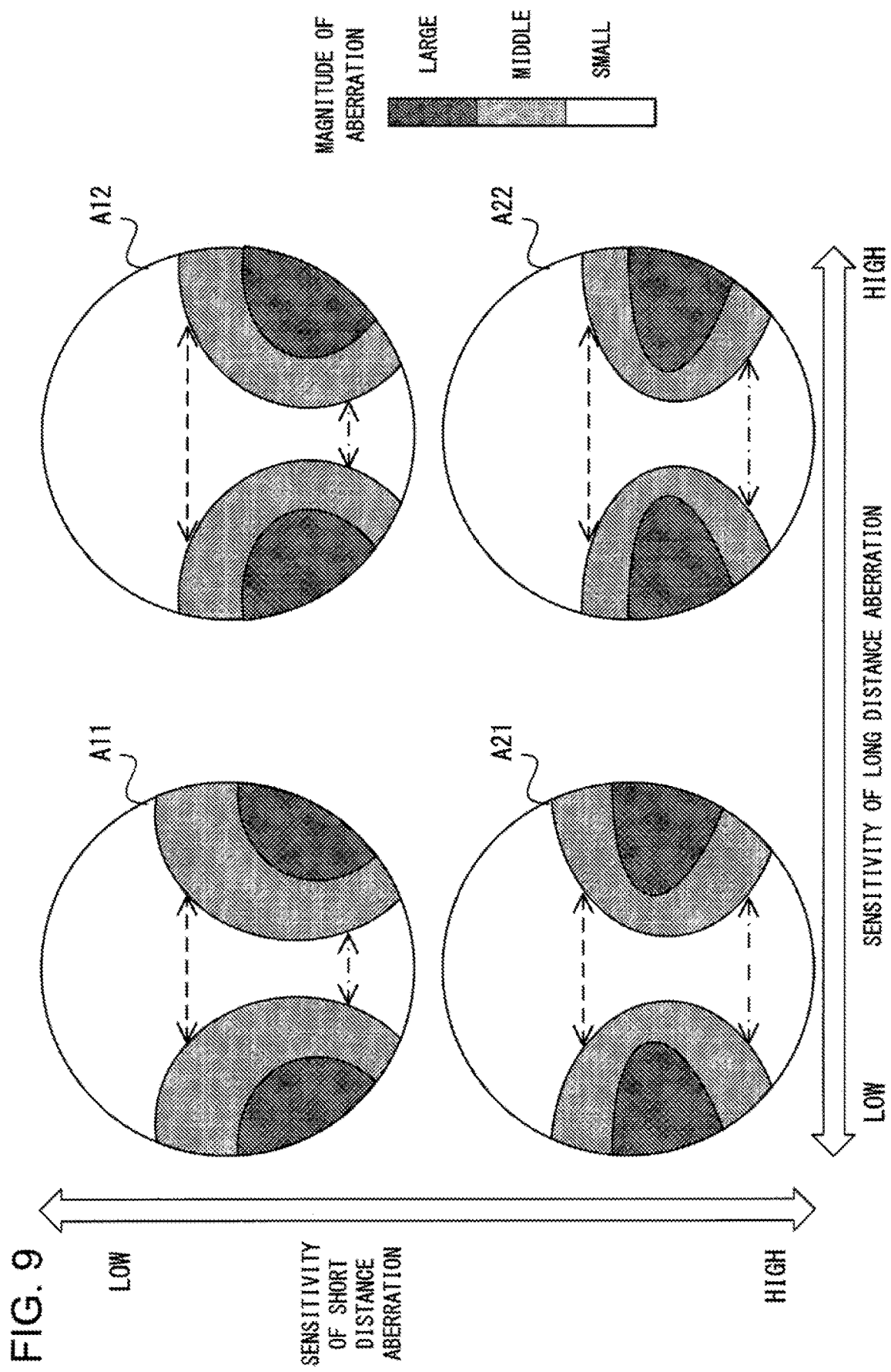

METHOD FOR DESIGNING SPECTACLE LENS, METHOD FOR MANUFACTURING SPECTACLE LENS, SPECTACLE LENS ORDER SENDING DEVICE, SPECTACLE LENS ORDER RECEIVING DEVICE, SPECTACLE LENS ORDER SENDING/RECEIVING SYSTEM, PROGRESSIVE POWER LENS, AND SINGLE FOCUS LENS

CROSS-REFERENCE TO RELATED APPLICATIONS

This application is a continuation of International Application No. PCT/JP2017/040785 filed Nov. 13, 2017, which claims priority benefit to Japanese Patent Application No. 2016-233004, filed Nov. 30, 2016, the disclosures of which are hereby incorporated in their entirety by reference.

TECHNICAL FIELD

The present invention relates to a method for designing a spectacle lens, a method for manufacturing a spectacle lens, a spectacle lens order sending device, a spectacle lens order receiving device, a spectacle lens order sending/receiving system, a progressive power lens, and a single focus lens.

BACKGROUND ART

Various designing methods have been proposed to realize a spectacle lens that fits with characteristics of an individual wearer. For example, in PTL1, a lens design criterion is selected in consideration of living environment information and the like of a wearer.

CITATION LIST

Patent Literature

PTL1: International Publication No. 2009/133887

SUMMARY OF INVENTION

According to the 1st aspect of the present invention, a method for designing a spectacle lens comprises: presenting a plurality of blurred images created by applying different degrees of blur to an original image and having a wearer see the blurred images; acquiring information on a sensitivity to blur of the wearer; and designing a spectacle lens based on the information on the sensitivity to blur of the wearer.

According to the 2nd aspect of the present invention, in the method for designing a spectacle lens according to the 1st aspect, it is preferred that the information on the sensitivity is information on whether or not the blurred image is acceptable for the wearer to see.

According to the 3rd aspect of the present invention, in the method for designing a spectacle lens according to the 1st or 2nd aspect, it is preferred that the plurality of blurred images are created by ray tracing of rays emitting from the original image and transmitting through refractors that generate different aberrations.

According to the 4th aspect of the present invention, in the method for designing a spectacle lens according to any one of the 1st to 3rd aspects, it is preferred that the plurality of blurred images are created based on a point spread function obtained by ray tracing in which rays emitting from a point at a predetermined distance from a retina transmit through a plurality of refractors generating different aberrations and are then incident on the retina.

According to the 5th aspect of the present invention, in the method for designing a spectacle lens according to the 3rd or 4th aspect, it is preferred that the plurality of refractors generating different aberrations comprise spectacle lenses having different spherical powers, astigmatic powers, or astigmatic axes.

According to the 6th aspect of the present invention, in the method for designing a spectacle lens according to the 1st or 2nd aspect, it is preferred that each of the plurality of blurred images is created by image processing of convoluting luminances or color depths of points of the original image based on a certain distribution function.

According to the 7th aspect of the present invention, in the method for designing a spectacle lens according to any one of the 1st to 6th aspects, it is preferred that the original image is an image of a target object that is assumed to be seen by the wearer at a predetermined distance away from the wearer.

According to the 8th aspect of the present invention, it is preferred that the method for designing a spectacle lens according to any one of the 1st to 7th aspects further comprises: presenting the plurality of blurred images at a plurality of different predetermined distances to the wearer.

According to the 9th aspect of the present invention, in the method for designing a spectacle lens according to any one of the 1st to 8th aspects, it is preferred that the wearer with a corrected visual acuity sees the blurred image.

According to the 10th aspect of the present invention, in the method for designing a spectacle lens according to any one of the 1st to 9th aspects, it is preferred that a target aberration of a progressive power lens is set based on the information on the sensitivity.

According to the 11th aspect of the present invention, in the method for designing a spectacle lens according to any one of the 1st to 10th aspects, it is preferred that based on the information on the sensitivity, a target extent of a range in which the astigmatism is small can be set in at least two regions selected from a distance zone, an intermediate zone, and a near zone of a progressive power lens.

According to the 12th aspect of the present invention, in the method for designing a spectacle lens according to any one of the 1st to 9th aspects, it is preferred that a target aberration at a peripheral portion of a single focus lens is set based on the information on the sensitivity.

According to the 13th aspect of the present invention, in a method for manufacturing a spectacle lens, a spectacle lens is designed by the method for designing according to any one of the 1st to 12th aspects.

According to the 14th aspect of the present invention, a spectacle lens order sending device comprises: an input unit to input information on a sensitivity to blur of a wearer, the information having been acquired by presenting a plurality of blurred images created by applying different degrees of blur to an original image and having the wearer see the blurred images; and a sending unit that sends the information input via the input unit or a design parameter determined based on the information to a spectacle lens order receiving device.

According to the 15th aspect of the present invention, a spectacle lens order receiving device comprises: a receiving unit that receives information on a sensitivity to blur of a wearer or a design parameter determined based on the information, the information having been acquired by presenting a plurality of blurred images created by applying different degrees of blur to an original image and having the wearer see the blurred images; and a design unit that designs a spectacle lens based on the information or the design parameters.

According to the 16th aspect of the present invention, a spectacle lens order sending/receiving system comprises: the spectacle lens order sending device according to the 14th aspect; and the spectacle lens order receiving device according to the 15th aspect.

According to the 17th aspect of the present invention, a progressive power lens is designed by the method for designing a spectacle lens according to the 10th aspect.

According to the 18th aspect of the present invention, a single focus lens is designed by the method for designing a spectacle lens according to the 12th aspect.

BRIEF DESCRIPTION OF DRAWINGS

FIG. 7 is a view illustrating an example of an order screen.

FIG. 9 is a conceptual view illustrating an example of setting an aberration in a progressive power lens.

DESCRIPTION OF EMBODIMENTS

Hereinafter, with reference to the drawings as required, a method for designing a spectacle lens, a method for manufacturing a spectacle lens, a spectacle lens order sending device, a spectacle lens order receiving device, a spectacle lens order sending/receiving system, and the like according to an embodiment will be described. In the following description, the unit of refractive power is represented by diopter (D) unless otherwise stated. Furthermore, in the following description, terms "above", "below", "upper portion", "lower portion", and the like for a spectacle lens are based on a positional relationship to the spectacle lens when the lens is worn.

Figure 1A:
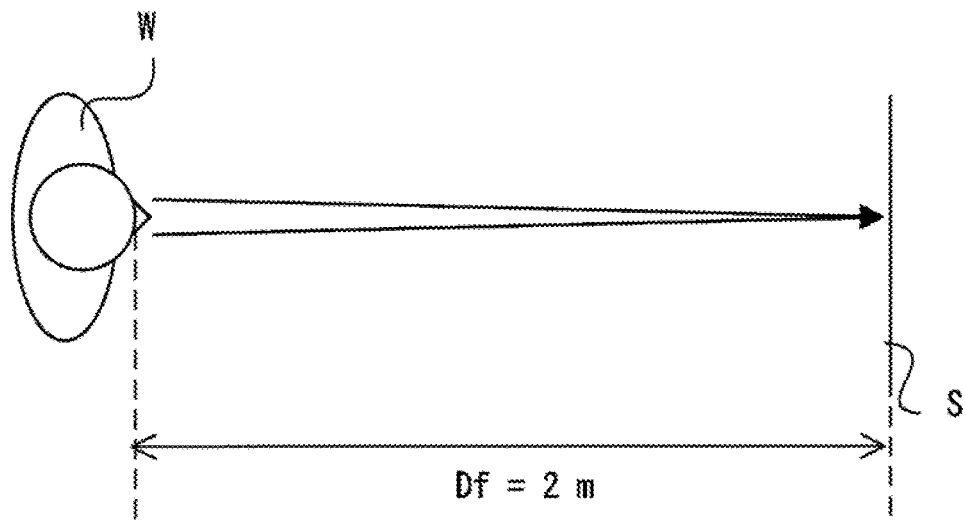
FIG. 1A is a conceptual view illustrating a situation of a test according to a method for designing according to an embodiment in a case where an image to be presented is at a long distance.
Figure 1B:
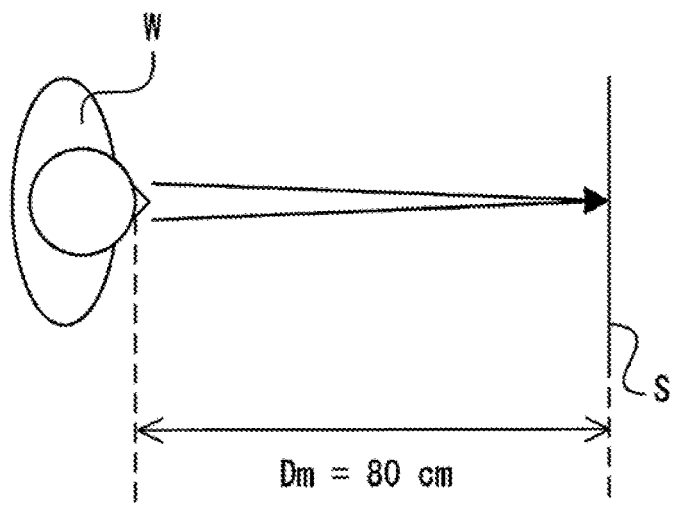
FIG. 1B is a conceptual view illustrating a situation of the test in a case where an image to be presented is at an intermediate distance.
Figure 1C:
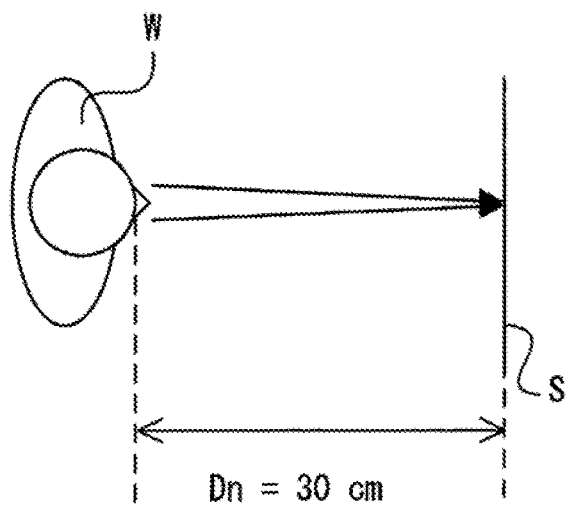
FIG. 1C is a conceptual view illustrating a situation of the test in a case where an image to be presented is at a short distance.

FIGS. 1A, 1B and 1C are views illustrating how a blur sensitivity test is performed on a wearer of a spectacle lens to be designed in the method for designing a spectacle lens of the present embodiment. In the blur sensitivity test, information on a sensitivity to blur in a field of vision of the wearer W is tested. The sensitivity to blur is denoted by, for example, a degree of blur that is acceptable for the wearer W who sees blurred images S or a degree of blur with which the wearer can see the blurred images S without discomfort, in a case where the blurred images S are created by applying blur to an image of a target object in various ways. If the sensitivity to blur is high, the wearer is likely to feel discomfort (uncomfortable feeling) even for an image having a small degree of blur (a range of an acceptable degree of blur is narrow). On the other hand, if the sensitivity to blur is low, the wearer is unlikely to feel discomfort (uncomfortable feeling) even for an image having a large degree of blur (a range of an acceptable degree of blur is large). The following embodiment describes a case where a degree of blur acceptable for the wearer W is measured in the blur sensitivity test, by way of example. An image before application of blur is herein referred to as an original image So.

In an eyeglass store, an inspector performing the blur sensitivity test has a wearer W see a plurality of blurred images S and/or an original image So presented at a predetermined distance from the wearer W. The plurality of blurred images S are created by applying different degrees of blur to the original image So. For the presentation to the wearer W, the blurred images S and/or the original image So are displayed on a display such as a tablet terminal or a personal computer (hereinafter referred to as a PC), or a printed material such as paper, for example. Preferably, the wearer sees the blurred images S with a visual acuity with which the wearer can clearly visually discern the original image So. Therefore, the inspector first adjusts the visual acuity of the wearer W by giving the wearer W a corrected visual acuity using a corrective lens or the like, as required, and then presents the blurred images S.

The inspector instructs the wearer W who is seeing or saw the blurred images S to answer whether or not the blurred images S are acceptable, for example, verbally or using an input device having buttons. Based on answers of the wearer W for the plurality of blurred images S, the inspector represents a degree of sensitivity to blur in a field of vision of the wearer W by a numerical value or the like according to a predetermined criterion and inputs the degree of sensitivity to blur to the order sending device. That is, the blurred images S are images used for sensitivity evaluation having degrees of blur corresponding to magnitudes of aberrations of a spectacle lens.

FIG. 1A is a conceptual view of the blur sensitivity test in a case where the wearer W sees a blurred image S presented at a position at a long distance (2 m in this example) from the wearer W. In FIG. 1A, a solid arrow schematically shows a line of sight of the wearer W in a case where the wearer W sees the blurred image S at a distance Df of 2 m with both eyes. In the long distance blur sensitivity test, the distance Df from eyes of the wearer W to the blurred image S can be appropriately set to a distance of 1 m or more. Note that numerical ranges of the distance corresponding to a long distance, a short distance (described later), and an intermediate distance (described later) may be changed as appropriate. Alternatively, the blur sensitivity test may also be performed for each eye at each distance.

The blurred images S presented in the long distance blur sensitivity test are preferably created from an image of a character, a symbol, or a sentence, or an image of a target object that the wearer W sees in daily life or a specific situation at a long distance, as an original image So. As the target object that the wearer sees at a long distance, a television, a scene in a room or outdoor landscape, a blackboard or a whiteboard on which characters or sentences are drawn, or the like can be used as appropriate.

FIG. 1B is a conceptual view of the blur sensitivity test in a case where the wearer W sees a blurred image S presented at a position at an intermediate distance (80 cm in this example) from the wearer W. In FIG. 1B, a solid arrow schematically shows a line of sight of the wearer W in a case where the wearer W sees the blurred image S at a distance Dm of 80 cm with both eyes. In the intermediate distance blur sensitivity test, the distance Dm from eyes of the wearer W to the blurred image S can be appropriately set to a distance equal to or more than 50 cm, and less than 1 m.

The blurred images S presented in the intermediate distance blur sensitivity test are preferably created from an image of a character, a symbol, or a sentence, or an image of a target object that the wearer W sees in daily life or a specific situation at an intermediate distance, as an original image So. As the target object that the wearer sees at an intermediate distance, a screen of a PC or the like can be used as appropriate.

FIG. 1C is a conceptual view of the blur sensitivity test in a case where the wearer W sees a blurred image S presented at a position at a short distance (here, 30 cm) from the wearer W. In FIG. 1C, a solid arrow schematically shows a line of sight of the wearer W in a case where the wearer W sees the blurred image S at a distance Dn of 30 cm with both eyes. In the short distance blur sensitivity test, the distance Dn from eyes of the wearer W to the blurred image S can be appropriately set to a distance equal to or more than 25 cm, and less than 50 cm.

The blurred images S presented in the short distance blur sensitivity test are preferably created from an image of a character, a symbol, or a sentence, or an image of a target object that the wearer W sees in daily life or a specific situation at a short distance, as an original image So. As the target object that the wearer sees at a short distance, a mobile phone such as a smart phone, a tablet, magazine, newspaper, or the like can be used as appropriate.

The blur sensitivity test may be performed at one of the long distance, the intermediate distance, and the short distance, or may be performed at a plurality of distances. The blur sensitivity test may be performed at two or more distances selected from a group consisting of the long distance, the intermediate distance, and the short distance.

A progressive power lens is a spectacle lens including a distance zone, a near zone, and an intermediate zone connecting the distance zone and the near zone so that a refractive index changes continuously, wherein the distance zone is arranged above the intermediate zone and a near zone is arranged below the intermediate zone. In a design of a progressive power lens including a distance zone having a refractive power corresponding to a long distance and a near zone having a refractive power corresponding to a short distance, the wearer W is preferably subjected to the blur sensitivity test at the long and short distances. In a design of a progressive power lens including a distance zone having a refractive power corresponding to an intermediate distance and a near zone having a refractive power corresponding to a short distance, the wearer W is preferably subjected to the blur sensitivity test at the intermediate and short distances. In a design of a progressive power lens, information obtained by the blur sensitivity test for the long distance or the intermediate distance is preferably used for a design of the distance zone, and information obtained by the blur sensitivity test for the short distance is preferably used for a design of the near zone.

Figure 2A:
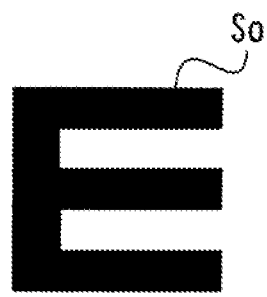
FIG. 2A is a view illustrating an original image before being processed into a blurred image.
Figure 2B:
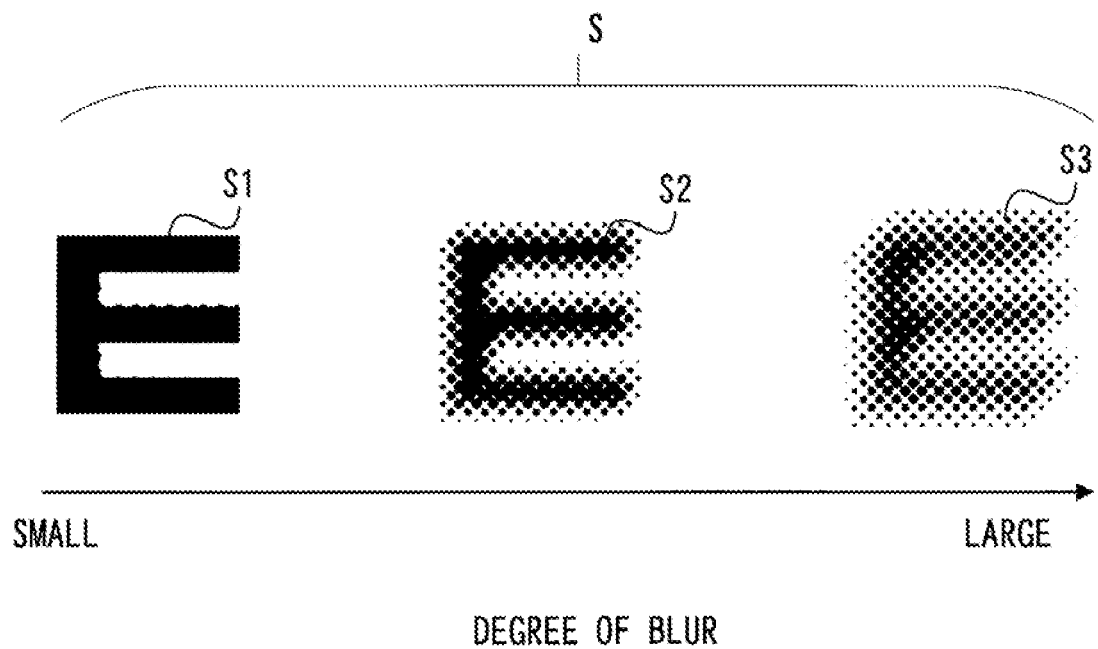
FIG. 2B is a view illustrating an example of the blurred image.

FIGS. 2A and 2B are views illustrating an original image So and blurred images S as an example. FIG. 2A shows an original image So of the letter "E". FIG. 2B shows a plurality of blurred images S created by applying different degrees of blur to the original image So. A blurred image S1 has a slight contour distortion and the like, i.e., a small degree of blur. A blurred image S2 has a contour line that cannot be clearly discerned, i.e., a moderate degree of blur. A blurred image S3 is generally unsharp, i.e., has a large degree of blur.

The blurred image S is a virtually created perceived image of an original image So in a case where a wearer W sees the original image So through an eye optical system that generates astigmatic vision, a refractor such as a spectacle lens that generates astigmatism, and the like. A degree of the astigmatic vision of the eye optical system and a degree of the astigmatism of the refractor correspond to a degree of blur of the created blurred image S. Therefore, based on the information on the sensitivity of the wearer W obtained for blurred images S corresponding to different degrees of blur, optical characteristics such as astigmatism of the spectacle lens to be designed can be appropriately adapted to the wearer W.

Figure 3:
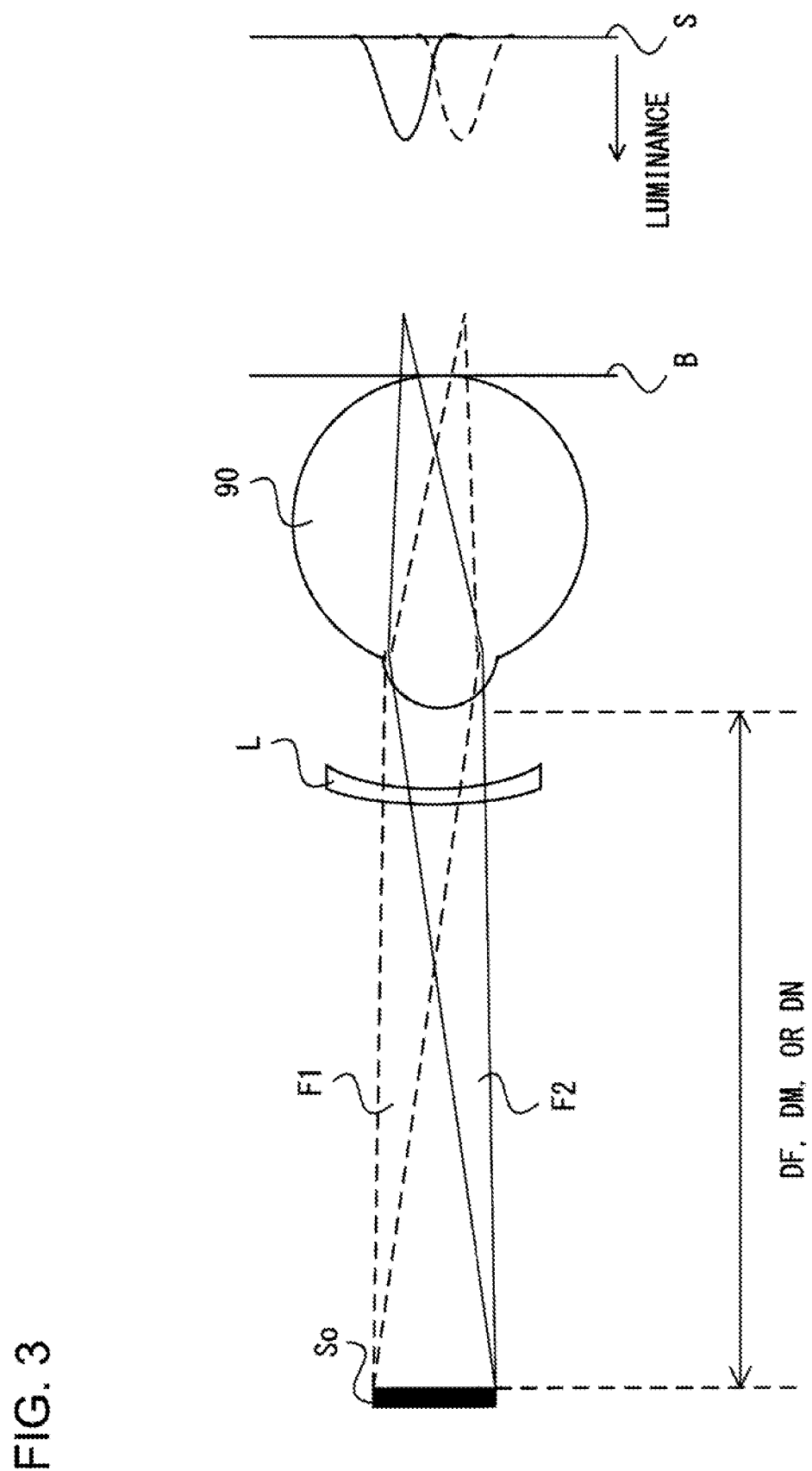
FIG. 3 is a conceptual view for explaining a method for creating a blurred image.

FIG. 3 is a conceptual view for explaining a method for creating a blurred image S. In the method for creating the blurred image S, an original image So is arranged at a position apart from a foremost part of an eyeball 90 by a distance (corresponding to Df, Dm, and Dn described above) between the wearer W and the blurred image S when the blur sensitivity test is performed. With a spectacle lens L arranged in an optical path directing from the original image So to the retina of the eyeball 90, a ray from each point of the original image So is traced. A calculation of the ray tracing can be performed using a PC or the like, as required.

In FIG. 3, as an example of a ray to be traced, a light flux F1 from the upper end of the original image So in the figure is represented by broken lines, and a light flux F2 from the lower end of the original image So in the figure is represented by solid lines. In the example of FIG. 3, a ray from the original image So converges at a point behind the retina due to refraction by the spectacle lens L and the eye optical system in the eyeball 90. That is, the focal point is not located on the retina. In this case, an image projected on the retina has a blur according to a defocus. A known ray tracing calculation can derive a distribution of an amount of light from the original image So reaching a projection plane B, which is perpendicular to an optical axis of the eye optical system and includes an intersection of the optical axis and the retina. Based on the distribution of the amount of light reaching the projection plane B obtained by this ray tracing, a distribution (e.g., a distribution of luminance, or a color depth in a case of a printed image) in the blurred image S is determined.

In the ray tracing model shown in FIG. 3, blurred images S having different degrees of blur can be created by appropriately changing optical characteristics of the spectacle lens L and the like. The blurred images S are preferably created by changing the astigmatic aberration of the spectacle lens L and the like, also in terms of achieving a correspondence between the degrees of blur of the blurred images S and the aberration.

In creating a plurality of blurred images used for the blur sensitivity test, the aberration is represented as an aberration amount of the spectacle lens or an aberration amount of the eye and the blurred images S are created with the aberration in a range from the minimum aberration amount 0D to the maximum aberration amount 1D through 3D at a certain interval such as 0.1D, 0.25D, or 0.5D, for example. In a case of a directional aberration such as astigmatism, the blurred images are created with a change in the aberration at a certain interval between an angle of 15 degrees and an angle of 90 degrees.

Note that the aberration is not necessarily a single aberration, but may be a combination of a plurality of aberrations and spherical power errors within the above-described range. Additionally, in creating the blurred images S, ray tracing may be performed using an eyeball model constructed in consideration of a distance to a target object, the age and a level of the accommodation ability of the wearer W, and the like. Thereby, the blurred images S can be more precisely created in consideration of a change in the accommodation ability of the eye.

In the method for designing a spectacle lens according to the present embodiment, target aberrations at one or more points of the spectacle lens to be designed and the upper limit value of an acceptable aberration can be set based on the obtained information on the sensitivity of the wearer W.

The following description illustrates an example of designing a progressive power lens including a distance zone having a refractive power corresponding to a long distance and a near zone having a refractive power corresponding to a short distance, wherein the blur sensitivity test is performed in the long distance and in the short distance.

A spectacle lens order sending/receiving system related to a design of a spectacle lens will be described. The spectacle lens order sending/receiving system related to the present embodiment can provide a spectacle lens with suitable characteristics such as aberration in accordance with a sensitivity to blur in a field of vision of a wearer W as described above.

Figure 4:
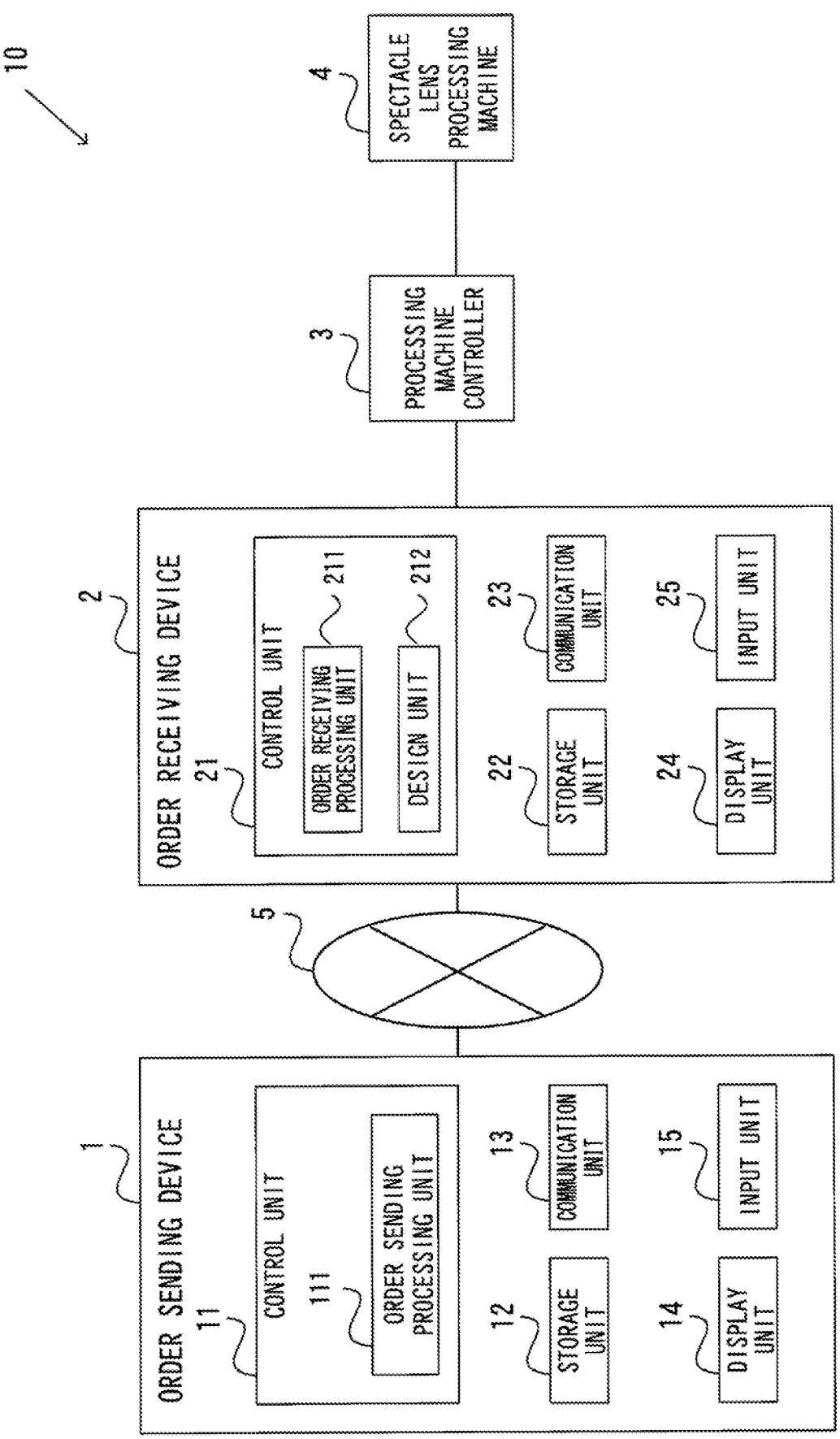
FIG. 4 is a view illustrating a spectacle lens order sending/receiving system.

FIG. 4 is a view illustrating a configuration of the spectacle lens order sending/receiving system 10 related to the present embodiment. The spectacle lens order sending/receiving system 10 includes an order sending device 1 installed in an eyeglass store (orderer), an order receiving device 2 installed in a lens maker, a processing machine controller 3, and a spectacle lens processing machine 4. The order sending device 1 and the order receiving device 2 are communicably connected via a network 5 such as the Internet. Further, the order receiving device 2 is connected to the processing machine controller 3, which is in turn connected to the spectacle lens processing machine 4.

Although only one order sending device 1 is shown in FIG. 4 for convenience of illustration, a plurality of order sending devices 1 installed in a plurality of eyeglass stores are connected to the order receiving device 2, in practice.

The order sending device 1 is a computer that performs order sending processing of a spectacle lens. The order sending device 1 includes a control unit 11, a storage unit 12, a communication unit 13, a display unit 14, and an input unit 15. The control unit 11 controls the order sending device 1 by executing a program stored in the storage unit 12. The control unit 11 includes an order sending processing unit 111 that performs order sending processing of a spectacle lens. The communication unit 13 communicates with the order receiving device 2 via the network 5. The display unit 14 is a display device such as a CRT or a liquid crystal display. The display unit 14 displays an order screen for inputting information (order information) of a spectacle lens to be ordered. The input unit 15 includes, for example, a mouse and a keyboard. For example, order information according to indications in the order screen is input via the input unit 15.

Note that the display unit 14 and the input unit 15 may be integrated into a touch panel or the like.

The order receiving device 2 is a computer that performs order receiving processing and design processing of a spectacle lens, arithmetic processing of optical performance, and the like. The order receiving device 2 includes a control unit 21, a storage unit 22, a communication unit 23, a display unit 24, and an input unit 25. The control unit 21 controls the order receiving device 2 by executing a program stored in the storage unit 22. The control unit 21 includes an order receiving processing unit 211 that performs order receiving processing of the spectacle lens, and a design unit 212 that performs design processing of the spectacle lens. The communication unit 23 communicates with the order sending device 1 via the network 5 and communicates with the processing machine controller 3. The storage unit 22 stores various types of data for spectacle lens design in such a manner that the data are readable. The display unit 24 is a display device such as a CRT or a liquid crystal display. The display unit 24 displays a result of designing the spectacle lens and the like. The input unit 25 includes, for example, a mouse and a keyboard.

Note that the display unit 24 and the input unit 25 may be integrated into a touch panel or the like.

Figure 5:
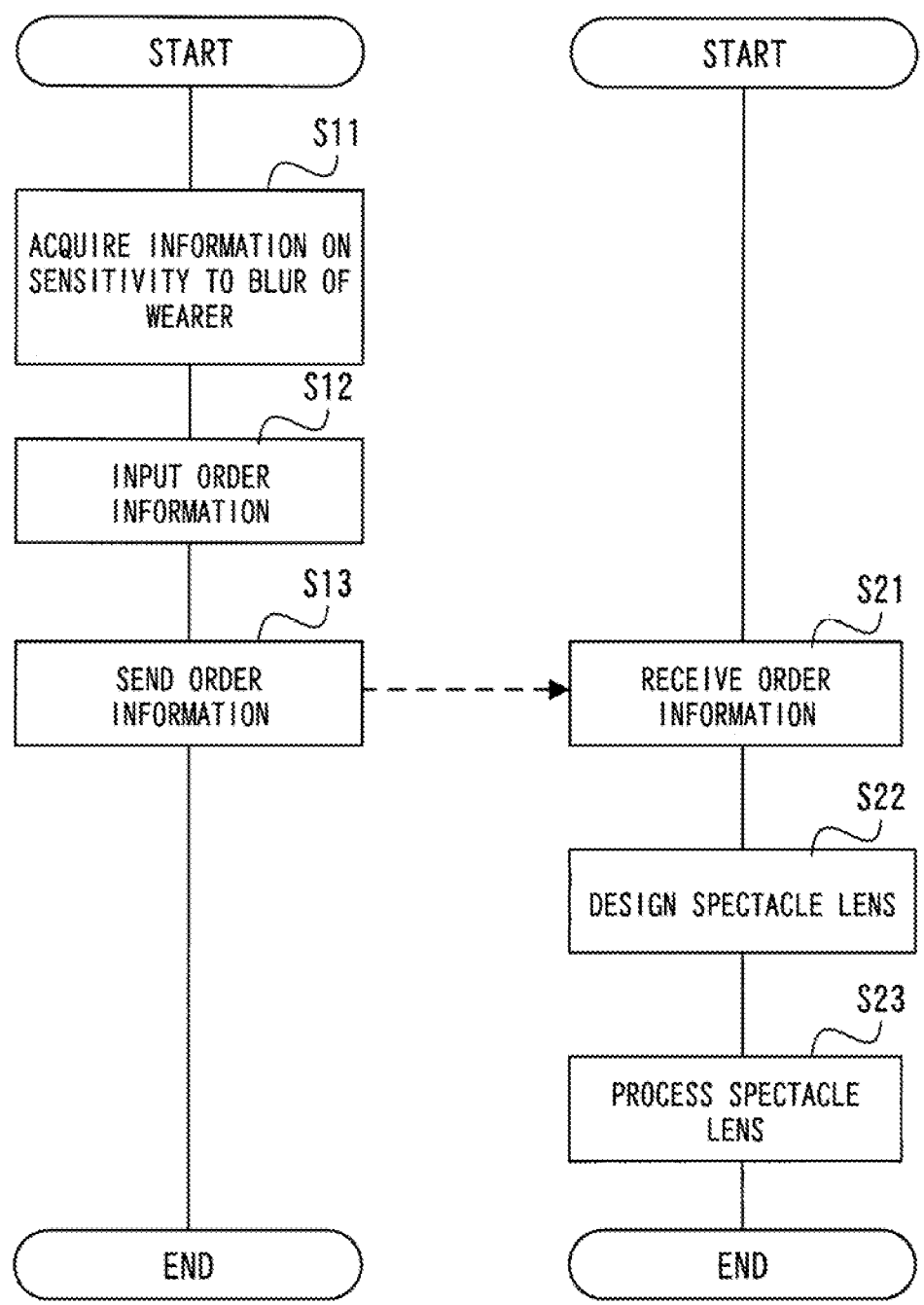
FIG. 5 is a flowchart illustrating a flow of the method for designing a spectacle lens according to the embodiment.

Next, a procedure of providing a spectacle lens in the spectacle lens order sending/receiving system 10 will be described using a flowchart shown in FIG. 5. The left side of FIG. 5 shows a procedure performed by an eyeglass store side and the right side of FIG. 5 shows a procedure performed by a lens maker side. In a method for manufacturing a spectacle lens in the spectacle lens order sending/receiving system 10, a spectacle lens is designed by the above-described method for designing a spectacle lens.

In step S11, an orderer acquires information on a sensitivity to blur of a wearer W.

Figure 6:
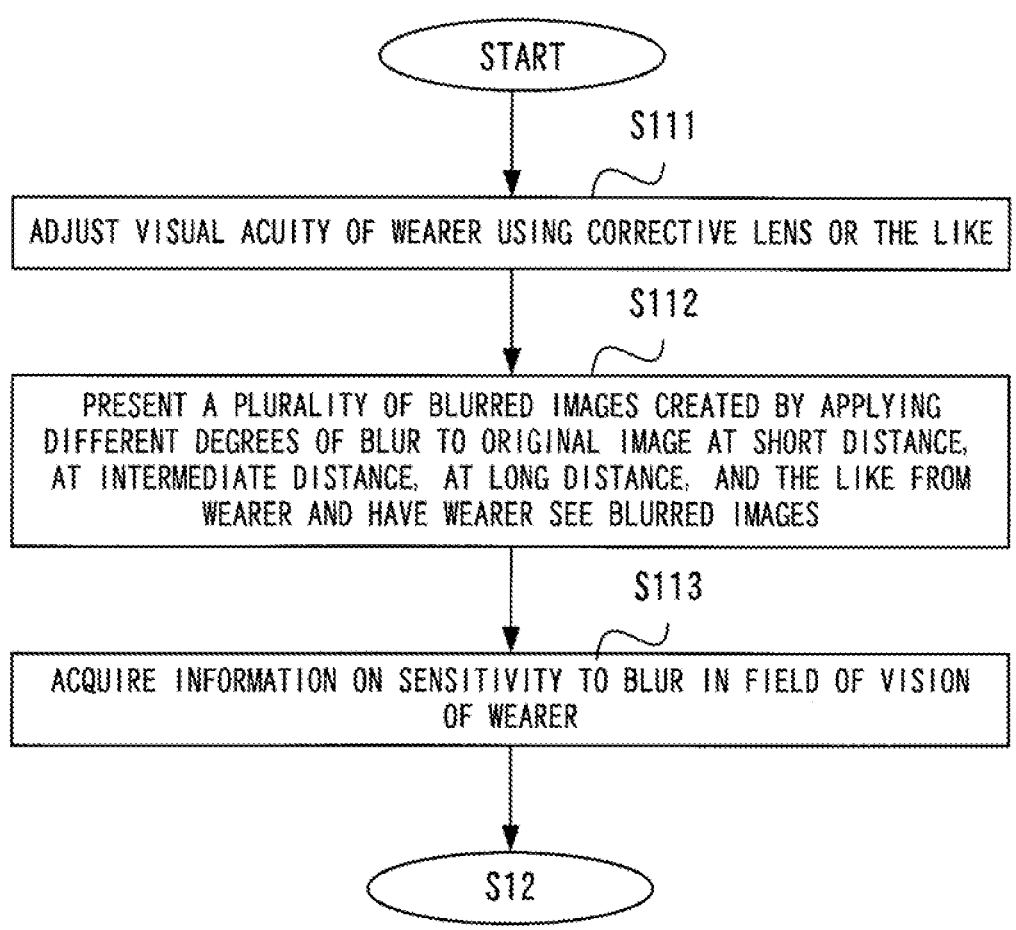
FIG. 6 is a flowchart illustrating a flow of the method for designing a spectacle lens according to the embodiment.

FIG. 6 is a flowchart showing step S11, which is further divided into a plurality of steps. In step S111, the orderer adjusts a visual acuity of the wearer W using a corrective lens or the like so that the wearer W can clearly see an original image So at a distance for performing a blur sensitivity test. After step S111 ends, the process proceeds to step S112.

In step S112, the orderer presents a plurality of blurred images S created by applying different degrees of blur to the original image So, at positions at a short distance, at an intermediate distance, at a long distance, and the like from the wearer W in order to have the wearer W see the blurred images. In the present embodiment, the orderer sequentially presents a plurality of blurred images S at a long distance (e.g., at a distance of 2 m from the wearer W) to create a progressive power lens for far and near visions. Similarly, the orderer sequentially presents a plurality of blurred images S at a short distance (e.g., 30 cm from the wearer W).

A sequence in which the blurred images S having different degrees of blur are presented is not particularly limited; however, an image having a small degree of blur that is sufficiently acceptable for the wearer is preferably presented at least once every several images in order to prevent habituation to blur. After step S112 ends, the process proceeds to step S113.

In step S113, the orderer acquires information on a sensitivity to blur in a field of vision of the wearer W. The orderer asks the wearer W about a degree of blur that is acceptable for the wearer W, for each distance. The orderer converts a level of the sensitivity to blur of the wearer W into a numerical value according to a predetermined criterion and records the value, for each distance. After step S113 ends, the process proceeds to step S12.

Alternatively, after performing steps S111 to S113 for a certain distance, the process may return to step S11 to perform a blur sensitivity test for a different distance. Thus, for each distance, a correction method according to the distance can be used. For example, in a design of a progressive power lens, in a case of measurement at a short-distance, a correction method at a short distance may be appropriately determined such that the measurement is performed after a correction by adding a spherical power, which corresponds to a required addition, to a prescription of a distance zone according to the required addition of the lens, for example.

In step S12, the orderer determines order information of a spectacle lens to be ordered, including information on the sensitivity to blur in the field of vision of the wearer W acquired in step S113. Then, the orderer causes the display unit 14 of the order sending device 1 to display an order screen and inputs the order information via the input unit 15.

FIG. 7 is a view illustrating an example of the order screen 100. In a lens information field 101, information items relating to a product name of a lens to be ordered and an ordered lens power such as a spherical power (S power), an astigmatic power (C power), an astigmatic axis angle, an addition, and the like is input. A processing specification information field 102 is used when an outer diameter of a lens to be ordered is specified or when a thickness at a certain point is specified. A dyeing information field 103 is used when a color of the lens is specified. In a fitting point (FP) information field 104, positional information of the eye of the wearer W is input. PD represents a pupillary distance. In a frame information field 105, a frame model name, a frame type, and the like are input. In a sensitivity information field 106, numerical values indicating the levels of the sensitivities to blur are input, in the blur sensitivity tests for the long distance and the short distance. In the example of FIG. 7, the levels of the sensitivities to blur are represented by numerical scores on a scale of 10 for the long and short distances ("5" for the long distance and "4" for the short distance). In the example of FIG. 7, the level of the sensitivity to blur is defined such that the greater the value, the higher the sensitivity to blur.

Images used in the blur sensitivity test are prepared as follows.

Images are graded into 10 levels where an image created with the minimum aberration amount is set as 10 and an image created with the maximum aberration amount is set as 0. Then, a level of an image having a blur that is specified as an acceptable limit for the wearer is set as a measurement value of the level of the sensitivity.

Note that the way of representation of the sensitivity to blur is not particularly limited as long as the sensitivity to blur can be represented according to a predetermined criterion. For example, the sensitivity to blur may be represented by a larger numerical value as the sensitivity to blur is lower or may be defined by a symbol instead of a numerical value.

In addition to the above-described information items, various types of information including fitting parameters such as a pantoscopic angle and a warp angle of the frame, and a distance between the eye and the lens, information on the accommodation ability of the wearer, and the like may be input on the order screen 100. In addition to, or instead of, the numerical value indicating the level of the sensitivity to blur of the wearer W, a design parameter calculated as an index indicating a range in which an astigmatism of the distance zone and/or the near zone is small may also be input. The design parameter may be, for example, a length of a line segment below which an aberration is equal to or less than a predetermined value, the line segment extending in the left-right direction on the lens in the distance zone or the near zone, for example, as indicated by broken arrows or dotted dashed arrows in FIG. 9 described later.

When the orderer inputs each item of the order screen 100 of FIG. 7 and clicks the send button (not shown in the figure), the order sending processing unit 111 of the order sending device 1 acquires the information (order information) input in each item of the order screen 100 and the process proceeds to step S13. In step S13, the order sending device 1 sends the order information to the order receiving device 2 via the communication unit 13.

In the order sending device 1, the control unit 11 of the order sending device 1 executes a predetermined program installed in advance in the storage unit 12 to perform the process of displaying the order screen 100, the process of acquiring the order information input in the order screen 100, and the process of sending the order information to the order receiving device 2.

In step S21 (FIG. 5), the order receiving processing unit 211 of the order receiving device 2 receives the order information from the order sending device 1 via the communication unit 23. Thereafter, the process proceeds to step S22. In step S22, the design unit 212 of the order receiving device 2 designs a spectacle lens based on the received order information.

Figure 8:
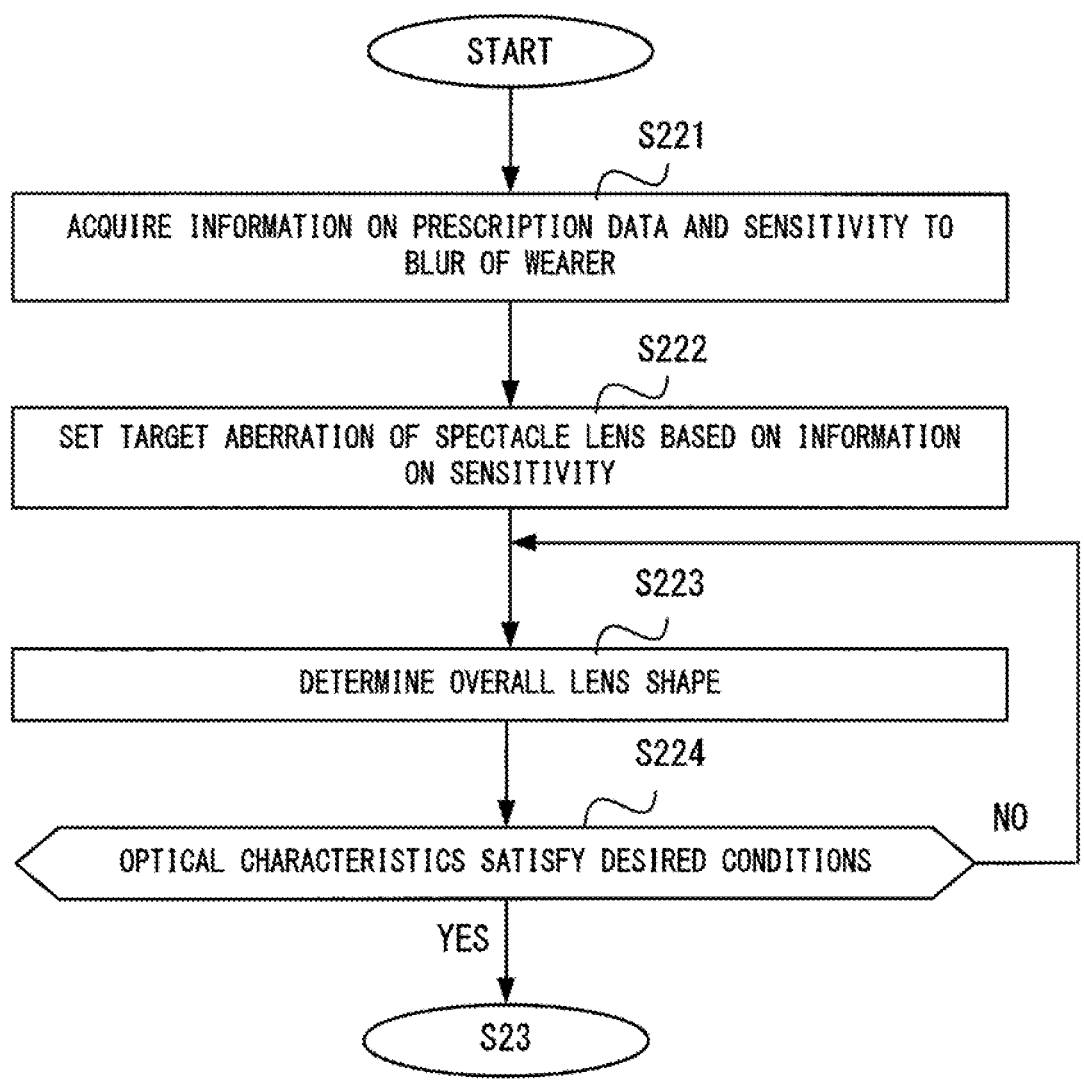
FIG. 8 is a flowchart illustrating a flow of the method for designing a spectacle lens according to the embodiment.

FIG. 8 is a flowchart illustrating a procedure of designing a spectacle lens corresponding to step S22. In step S221, the order receiving device 2 acquires prescription data of the spectacle lens, and information on the sensitivity to blur of the wearer W, or a design parameter such as an index indicating a range in which the astigmatisms of the distance zone and/or the near zone are small. The order receiving device 2 also acquires, for example, fitting parameters such as a pantoscopic angle and a warp angle of the frame, a distance between an eye and a lens, and the like, as required. After step S221 ends, the process proceeds to step S222.

In step S222, the design unit 212 of the order receiving device 2 sets a target aberration of the spectacle lens based on the information on the sensitivity to blur in the field of vision of the wearer W or the design parameters acquired in step S221.

FIG. 9 is a conceptual view illustrating an example of setting of the target aberration based on the sensitivity to blur of the wearer W. Four aberration distribution charts are shown in the center of the figure, and a magnitude of the aberration is shown in the rightmost part of the figure, wherein the magnitude corresponds to a pattern used to represent a magnitude of the aberration in the aberration distribution charts. A broken arrow extends in the left-right direction in the distance zone, indicating a width of a section where the magnitude of the aberration is equal to or less than a predetermined value. This length is an index indicating a range in which the astigmatism of the distance zone is small. A dotted dashed arrow extends in the left-right direction in the near zone, indicating a width of a section where the magnitude of the aberration is equal to or less than a predetermined value. This length is an index indicating a range in which the astigmatism of the near zone is small. Positions in the top-down direction of the dashed arrow and the dotted dashed arrow may be freely set. For example, the positions are determined with reference to a position of the far vision measurement point (distance power measurement position) or a position of the near vision measurement point (near power measurement position).

Of the four aberration distribution charts shown in FIG. 9, an aberration distribution chart A11 at the upper left is a lens for a wearer W who has low sensitivities of the short distance and long distance astigmatism. Although the lens has a narrow range in which the astigmatism is small, a change in the astigmatism is small and thus a distortion of the contour is small. An aberration distribution chart A12 at the upper right is a lens for a wearer W who has a sensitivity at the long distance astigmatism higher than that in the case of the aberration distribution chart A11. The lens is designed to have a wider range in which the astigmatism of the distance zone is small, than the range in the case of the aberration distribution chart A11. An aberration distribution chart A21 at the lower left is a lens for a wearer W who has a sensitivity of the short distance astigmatism higher than that in the case of the aberration distribution chart A11. The lens is designed to have a wider range in which the astigmatism of the near zone is small, than the range in the case of the aberration distribution chart A11. An aberration distribution chart A22 at the lower right is a lens for a wearer W who has sensitivities to astigmatisms at the short distance and the long distance higher than those in the case of the aberration distribution chart A11. The lens is designed to have wider ranges in which the astigmatisms of the near zone and distance zone is small, than the ranges in the case of the aberration distribution chart A11.

In step S223 (FIG. 8), the order receiving device 2 determines an overall lens shape of the spectacle lens. When the overall lens shape is determined, the process proceeds to step S224. In step S224, the order receiving device 2 determines whether or not optical characteristics such as the refractive power and the astigmatism of the spectacle lens satisfy desired conditions. If the desired conditions are satisfied, affirmative determination is done for step S224. Then, the design processing ends and the process proceeds to step S23 (see FIG. 5). When the desired conditions are not satisfied, negative determination is done for step S224 and the process returns to step S223.

In step S23, the order receiving device 2 outputs design data of the spectacle lens designed in step S22 to the processing machine controller 3. The processing machine controller 3 sends processing instructions to the spectacle lens processing machine 4 based on the design data output from the order receiving device 2. As a result, the spectacle lens processing machine 4 perform processes to manufacture a spectacle lens based on the design data. The spectacle lens manufactured by the spectacle lens processing machine 4 is shipped to the eyeglass store, fit in the spectacle frame, and supplied to a customer (wearer W).

In the order receiving device 2, the control unit 21 of the order receiving device 2 executes a predetermined program installed in advance in the storage unit 22 to perform the process of receiving the order information from the order sending device 1, the process of designing the spectacle lens based on the received order information, and the process of outputting the design data of the spectacle lens to the processing machine controller 3.

According to the above-described embodiment, the following operational advantages can be achieved.

(1) The method for designing a spectacle lens and the method for manufacturing a spectacle lens according to the present embodiment includes: presenting a plurality of blurred images S created by applying different degrees of blur to an original image So, at a predetermined distance such as at a long distance, at an intermediate distance or at a short distance from the wearer W and having the wearer W see the blurred images; and acquiring information on a sensitivity to blur in a field of vision of the wearer W. Thereby, an appropriate spectacle lens can be designed based on the sensitivity to blur of the wearer W.

(2) In the method for designing a spectacle lens according to the present embodiment, the information on the sensitivity is information on whether or not the blurred image S is acceptable for the wearer W to see. Thereby, a spectacle lens suitable for the wearer W can be designed in consideration of a range of an acceptable aberration corresponding to an acceptable blurred image S.

(3) In the method for designing a spectacle lens according to the present embodiment, the plurality of blurred images S are created by ray tracing of rays emitting from the original image So and transmitting through the spectacle lenses L that generate different aberrations. Thereby, a blurred image S that more accurately represents a blur generated by a refractor such as a spectacle lens can be created, so that the sensitivity to blur in the field of vision of the wearer W can be more accurately measured.

(4) In the method for designing a spectacle lens according to the present embodiment, in the ray tracing for creating different blurred images S, a plurality of refractors that generate different aberrations include spectacle lenses L having different spherical powers, astigmatic powers, or astigmatic axes. Thereby, a spectacle lens L can be more effectively designed from information on the sensitivity to blur, by corresponding the aberration of the spectacle lens L to the degree of blur of the blurred image S.

(5) In the method for designing a spectacle lens according to the present embodiment, the original image So is an image of a target object that is assumed to be seen by the wearer W at a predetermined distance away from the wearer W, such as a long distance, an intermediate distance, or a short distance. Thereby, the sensitivity to blur of the wearer W can be properly measured depending on a situation where an actually designed spectacle lens is used.

(6) The method for designing a spectacle lens according to the present embodiment includes presenting a plurality of blurred images at a plurality of different predetermined distances to the wearer W, wherein the plurality of predetermined distances are two or more distances selected from a group consisting of a short distance equal to or more than 25 cm and less than 50 cm, an intermediate distance equal to or more than 50 cm and less than 1 m, and a long distance of 1 m or more. Thereby, in the design of the progressive power lens, the zone corresponding to each distance can be properly designed based on the sensitivity to blur of the wearer W.

(7) In the method for designing a spectacle lens according to the present embodiment, the wearer W with a corrected visual acuity sees the blurred image S. Thereby, the sensitivity to blur of the wearer W can be accurately measured.

(8) In the method for designing a spectacle lens according to the present embodiment, a target aberration of the progressive power lens is set based on the information on the sensitivity. Thereby, an appropriate spectacle lens can be designed based on the sensitivity to blur of the wearer W.

(9) A spectacle lens order sending device according to the present embodiment includes: an input unit 15 to input information on a sensitivity to blur in a field of vision of a wearer W, the information having been acquired by presenting a plurality of blurred images S created by applying different degrees of blur to an original image So at predetermined distances such as a long distance, intermediate distance or short distance from the wearer W and having the wearer W see the blurred images; and a communication unit 13 that sends the information input via the input unit 15 or a design parameter determined based on the information to a spectacle lens order receiving device. Thereby, a spectacle lens can be ordered in consideration of the sensitivity to blur of the wearer W.

(10) A spectacle lens order receiving device according to the present embodiment includes: a receiving unit that receives information on a sensitivity to blur in a field of vision of a wearer W or a design parameter determined based on the information, the information having been acquired by presenting a plurality of blurred images S created by applying different degrees of blur to an original image So, at predetermined distances such as a long distance, intermediate distance, or short distance from the wearer W and having the wearer W see the blurred images; and a design unit that designs a spectacle lens based on the information or the design parameter. Thereby, a spectacle lens order can be received and the spectacle lens can be designed in consideration of the sensitivity to blur of the wearer W.

The following variations are also encompassed within the scope of the present invention and can be combined with the above-described embodiment.

(First Variation)

In the above-described embodiment, ray tracing is performed from each point of an original image So to create a blurred image S. However, a blurred image S may be created by calculating a point spread function (PSF) by ray tracing from one point and convoluting luminances or color depths of points of the original image So using the point spread function.

Figure 10A:
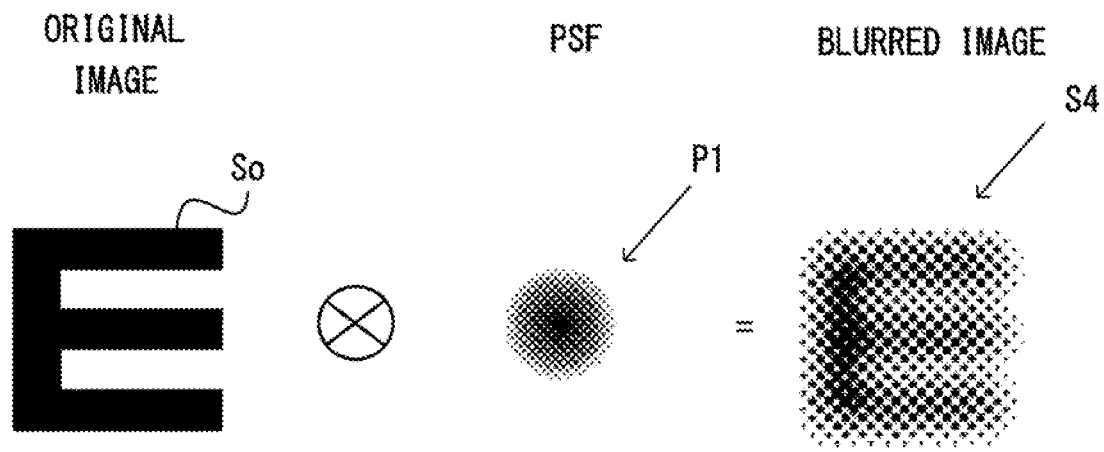
FIG. 10A is a conceptual view for explaining a method for creating a blurred image having no directional dependency.

FIG. 10A is a conceptual view illustrating how a blurred image S4 is created based on a refractive power error in a case where no astigmatism is generated. A symbol having X in a circle indicates convolution. When the original image So is convoluted with a point spread function corresponding to a point spread P1 having no directional dependency, an image in which each point is uniformly blurred is obtained, such as the blurred image S4. Hereinafter, the blurred image S4 is referred to as a directionally independent blurred image, as required.

Figure 10B:
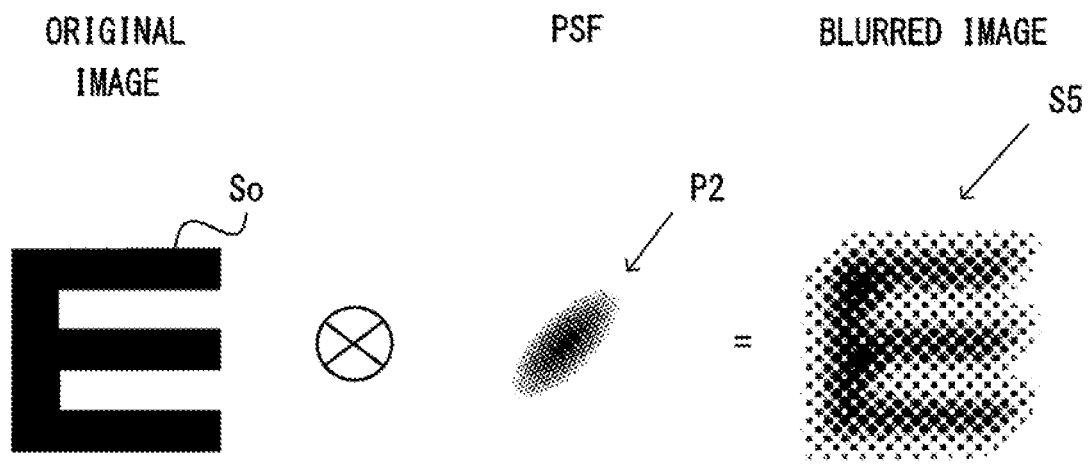
FIG. 10B is a conceptual view for explaining a method for creating a directionally dependent blurred image.

FIG. 10B is a conceptual view illustrating how a blurred image S5 is created in a case where an astigmatism occurs. A symbol having X in a circle indicates convolution. When the original image So is convoluted with a point spread function corresponding to a point spread P2 having a directional dependency (obliquely at an angle of 45°), an image in which each point is blurred in the oblique direction is obtained, such as the blurred image S5. Hereinafter, the blurred image S5 is referred to as a directionally dependent blurred image, as required. The directional dependency of the directionally dependent blurred image S may be determined based on a direction of an astigmatism axis of a wearer W.

The directionally dependent blurred image and the directionally independent blurred image having a desired degree of blur can also be appropriately obtained by the method shown in FIG. 3 in which ray tracing is performed from points of the original image So, by adjusting optical characteristics of a refractor such as a spectacle lens L inserted in an optical path.

In the method for designing a spectacle lens according to the present variation, the plurality of blurred images S can be created based on a point spread function obtained by ray tracing in which rays emitting from a point at a predetermined distance, such as a long distance, an intermediate distance, or a short distance from a retina, transmit through a plurality of refractors that generate different aberrations and are then incident on the retina. Thereby, the blurred image S under various conditions can be conveniently created.

(Second Variation)

In the above-described embodiment, the blurred image S is created by ray tracing. Alternatively, the blurred image S may be created by image processing of convoluting luminances or color depths of points of the image with a specific distribution function as a kernel, using an arithmetic device such as a PC. Thereby, various blurred images S can be created by a convenient method.

(Third Variation)

In the method for designing according to the above-described embodiment, the example of setting the target aberration of the progressive power lens has been described. However, the method is not necessary to limit to this example. For a single focus lens, the design can also be performed using information on the sensitivity of the wearer W. In a design of a single focus lens, it is possible to set a spherical power error, which is a deviation of the refractive power from the spherical power, and an astigmatism, at the periphery of the lens based on the information on the sensitivity of the wearer W.

Figure 11A:
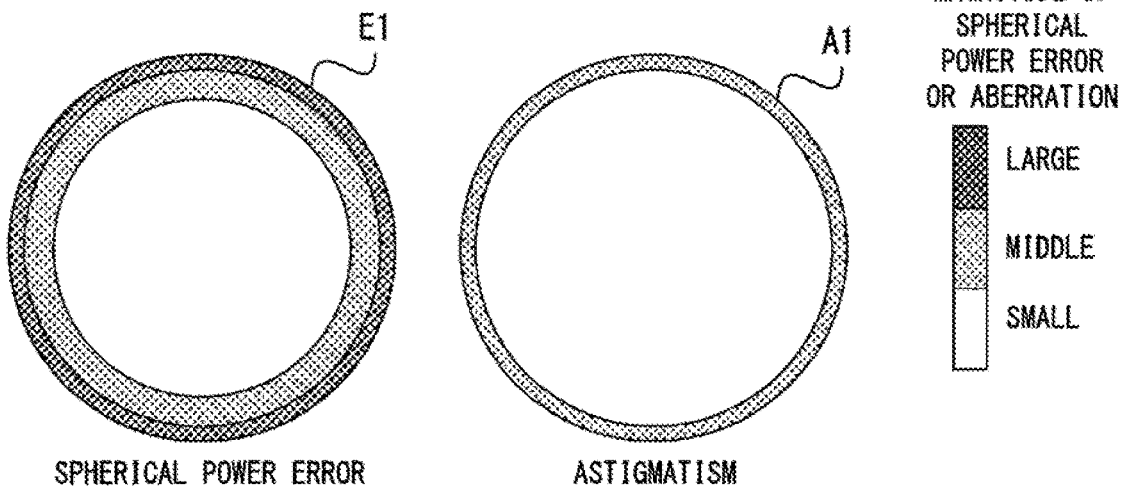
FIG. 11A is a conceptual view illustrating an example of setting a spherical power error and an aberration in a single focus lens in which astigmatism is prioritized.
Figure 11B:
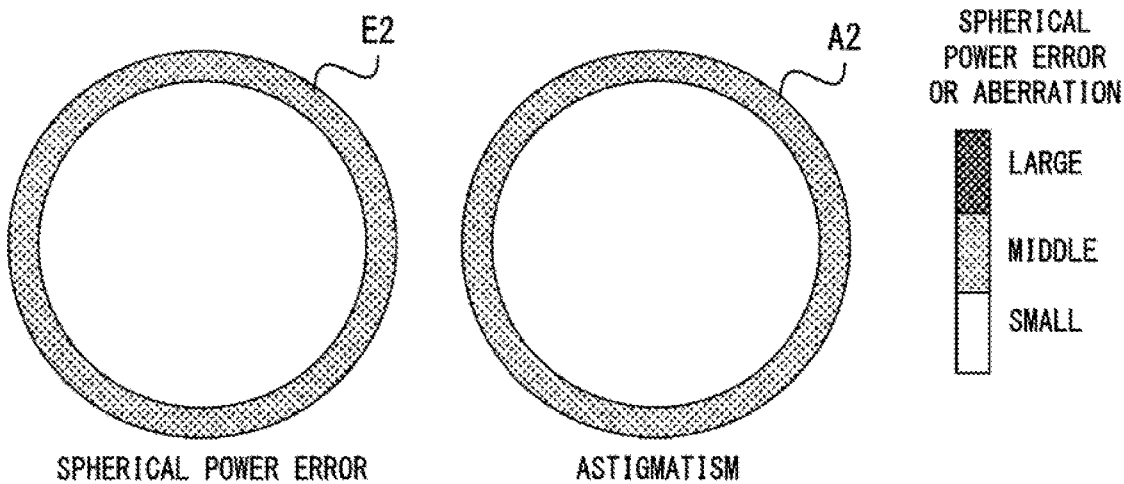
FIG. 11B is a conceptual view illustrating an example of setting a spherical power error and an aberration in a single focus lens in which a moderate balance between the spherical power error and the astigmatism is set.
Figure 11C:
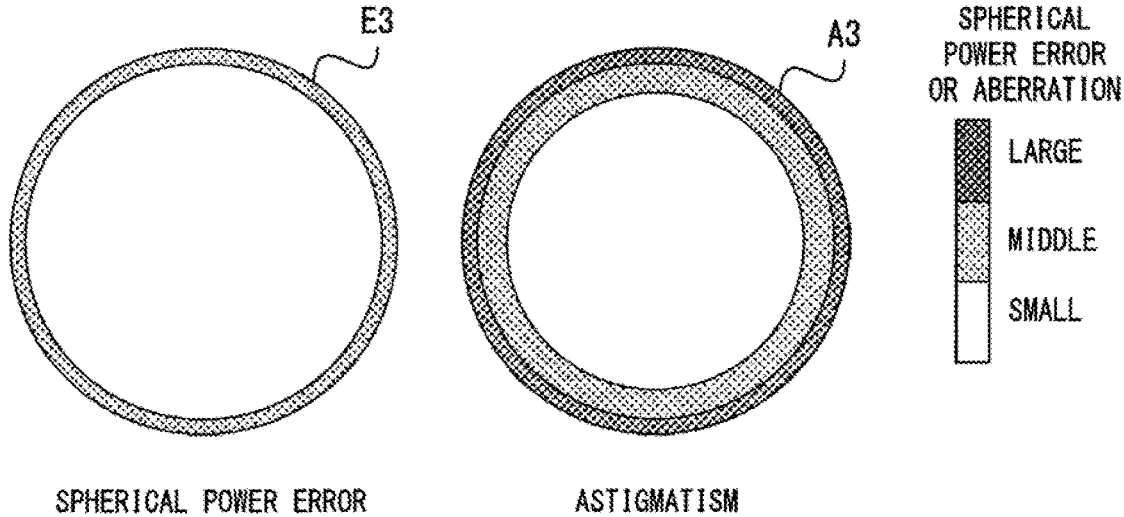
FIG. 11C is a conceptual view illustrating an example of setting a spherical power error and an aberration in a single focus lens in which the spherical power error is prioritized.

FIGS. 11A, 11B and 11C are views illustrating examples of setting of a spherical power error and an astigmatism of a single focus lens. In FIGS. 11A to 11C, distribution charts of the spherical power errors and distribution charts of the astigmatisms are shown. A magnitude of the spherical power error or the aberration is shown in the rightmost part of the figures, wherein the magnitude corresponds to a pattern used in the distribution charts is shown.

FIG. 11A is a view illustrating an example of a design that prioritizes the astigmatism. Due to a reduced magnitude of the astigmatism, a single focus lens having a distribution E1 of the spherical power error and a distribution A1 of the astigmatism shown in FIG. 11A is suitably used for a wearer W who has a high sensitivity to astigmatism. FIG. 11B is a view illustrating an example of a design that prioritizes a balance between the spherical power error and the astigmatism. Due to a reduced spherical power error, a single focus lens having a distribution E2 of the spherical power error and a distribution A2 of the astigmatism shown in FIG. 11B is suitably used for a wearer W who has an average sensitivity to astigmatism, although a magnitude of the astigmatism is larger than that in the case of FIG. 11A. FIG. 11C is a view illustrating an example of a design that prioritizes the spherical power. Due to a reduced magnitude of the spherical power error, a single focus lens having a distribution E3 of the spherical power error and a distribution A3 of the astigmatism shown in FIG. 11C is suitably used for a wearer W who has a low sensitivity to astigmatism.

In the method for designing a spectacle lens according to the present variation, the target aberration at the peripheral portion of the single focus lens is set based on the information on the sensitivity to blur. As a result, a single focus lens suitable for the wearer W can be provided in consideration of the sensitivity to blur of the wearer W for the peripheral portion of the field of vision.

(Fourth Variation)

In the above-described embodiment, a design parameter may be set based on measurement values of the blur sensitivity test of a wearer and statistical data of a large number of subjects who have undergone the blur sensitivity test, as follows:

An average value M and a standard deviation σ of the long distance blur sensitivity measurement values are determined from a result of a test conducted in advance for a large number (e.g., 30 or more) of subjects. For the test, the subjects are grouped according to the age: for example, subjects aged 40 years or more for a progressive power lens and subjects under 40 for a single focus lens. A long distance sensitivity range constant K can be any value between 1 and 3 times the standard deviation σ of the above-described measurement values. For example, the K value can be set to be small when the difference in the sensitivity of long distance aberration is to be reflected in the lens design to a large extent; in contrast, the K value can be set to be large when the difference in the sensitivity of long distance aberration is to be reflected in the lens design to a small extent.

From a long distance sensitivity measurement value D of the wearer, a distance zone design parameter P is calculated as:

$$P = (D-M)/K$$

A target value Rtf of an extent of a range in which the astigmatism of the distance zone is small is calculated from the maximum value Rfmax and the minimum value Rfmin using the design parameter P as follows:

$$Rft = (Rf\max + Rf\min)/2 + P*(Rf\max - Rf\min)/2$$

A similar calculation is performed for the short distance. However, if Rft>Rfmax, Rft is set to Rfmax, and if Rft<Rmin, Rft is set to Rfmin. Similarly, a target value Rnt of an extent of a range in which the astigmatism of the near zone is small is determined.

Of the four aberration distribution charts shown in FIG. 9, the aberration distribution chart A11 at the upper left corresponds to a lens in a case where design target values of the extents of the ranges in which astigmatisms at the short distance and the long distance are small are both the minimum values Rfmin, Rnmin. Although the lens has a narrow range in which the astigmatisms are small, a change in the astigmatisms is small and thus a distortion of the contour is small. In an aberration distribution chart A12 at the upper right, the design target value of the extent of the range in which the astigmatism of the distance zone is small is set to the maximum value Rfmax, and the design target value of the extent of the range in which the astigmatism of the near zone is small is set to the minimum value Rnmin. This lens is suitable for a wearer W who has the sensitivity at the long distance higher than that in the aberration distribution chart A11. In the aberration distribution chart A21 at the lower left, the design target value of the extent of the range in which the astigmatism of the distance zone is small is set to the minimum value Rfmin, and the design target value of the extent of the range in which the astigmatism of the near zone is small is set to the maximum value Rnmax. This lens is suitable for a wearer W who has the sensitivity of an astigmatism at the short distance higher than that in the aberration distribution chart A11. In the aberration distribution chart A22 at the lower right, the design target values of the extents of the ranges in which the astigmatisms of the near zone and the distance zone are small are set to both the maximum value Rfmax, Rnmax. This lens is suitable for a wearer W who has the sensitivities to astigmatisms at the short distance and the long distance higher than those in the aberration distribution chart A11.

Within a range of a rectangle having these four corners, target values of the design are determined by values of the long distance target value Rft and the short distance target value Rnt.

Note that, based on the information on the sensitivity, a target extent of the range in which the astigmatism is small may also be set for the intermediate zone of the progressive power lens.

In the present variation, based on the information on the sensitivity, the target extent of a range in which the astigmatism is small can be set in at least two regions selected from the distance zone, the intermediate zone, or the near zone of the progressive power lens. Thereby, a progressive power lens that is more suitable for the wearer can be provided based on the sensitivity to blur of the wearer.

The present invention is not limited to the above-described embodiment. Other embodiments contemplated within the scope of the technical idea of the present invention are also included within the scope of the present invention.

REFERENCE SIGNS LIST

1 . . . order sending device, 2 . . . order receiving device, 10 . . . spectacle lens order sending/receiving system, 11 . . . control unit of order sending device, 13 . . . communication unit of order sending device, 21 . . . control unit of order receiving device, 23 . . . communication unit of order receiving device, 100 . . . order screen, 106 . . . sensitivity information field, S . . . blurred image, So . . . original image, W . . . wearer

The invention claimed is:

1. A method for designing a spectacle lens, the method comprising:

for each of a long distance, an intermediate distance, and a short distance from a wearer to a corresponding, respective original image of original images, applying a blur sensitivity test by presenting a plurality of blurred images created by applying different degrees of blur based on convoluting through image processing luminances or color depths of points of the original image to the corresponding, respective original image and having a wearer see the blurred images of the corresponding, respective original image, each of the corresponding, respective original images being objects which the wearer sees in daily life or in a specific situation at the corresponding, respective long distance, intermediate distance, and short distance, the degrees of blur corresponding to magnitudes of aberrations of the spectacle lens;

acquiring information on a sensitivity to blur of the wearer based on the blur sensitivity test; and designing a spectacle lens based on the information on the sensitivity to blur of the wearer.

2. The method for designing a spectacle lens according to claim 1, wherein:

the information on the sensitivity is information on whether or not the blurred image is acceptable for the wearer to see.

3. The method for designing a spectacle lens according to claim 1, wherein:

the plurality of blurred images are created by ray tracing of rays emitting from the original image and transmitting through refractors that generate different aberrations.

4. The method for designing a spectacle lens according to claim 1, wherein:
the plurality of blurred images are created based on a point spread function obtained by ray tracing in which rays emitting from a point at a predetermined distance from a retina transmit through a plurality of refractors generating different aberrations and are then incident on the retina.

5. The method for designing a spectacle lens according to claim 3, wherein:
the plurality of refractors generating different aberrations comprise spectacle lenses having at least one of different spherical powers, astigmatic powers, or astigmatic axes.

6. A method for designing a spectacle lens, the method comprising:
for each of a long distance, an intermediate distance, and a short distance from a wearer to a corresponding, respective original image of original images, presenting a plurality of blurred images created by applying different degrees of blur to the corresponding, respective original image and having a wearer see the blurred images of the corresponding, respective original image, each of the corresponding, respective original images being objects which the wearer sees in daily life or in a specific situation at the corresponding, respective long distance, intermediate distance, and short distance;
acquiring information on a sensitivity to blur of the wearer; and
designing a spectacle lens based on the information on the sensitivity to blur of the wearer, wherein:
each of the plurality of blurred images is created by image processing of convoluting luminances or color depths of points of the original image based on any distribution function.

7. The method for designing a spectacle lens according to claim 1, wherein:
the wearer is wearing at least one corrective lens that provides a corrected visual acuity of the wearer while the wearer sees at least one blurred image.

8. The method for designing a spectacle lens according to claim 1, wherein:
a target aberration of a progressive power lens is set based on the information on the sensitivity.

9. The method for designing a spectacle lens according to claim 1, wherein:
based on the information on the sensitivity, a target extent of a range in which an astigmatism is small can be set in at least two regions selected from a distance zone, an intermediate zone, and a near zone of a progressive power lens.

10. The method for designing a spectacle lens according to claim 1, wherein:
a target aberration at a peripheral portion of a lens is set based on the information on the sensitivity.

11. A method for manufacturing a spectacle lens, wherein:
a spectacle lens is designed by the method for designing according to claim 1 and manufactured.

12. A spectacle lens order sending device, comprising:
an input unit to input information on a sensitivity to blur of a wearer, the information based on applying a blur sensitivity test by, for each of a long distance, an intermediate distance, and a short distance from a wearer to a corresponding, respective original image of original images, presenting a plurality of blurred images created by applying different degrees of blur based on convoluting through image processing luminances or color depths of points of the original image to the corresponding, respective original image and having the wearer see the blurred images of the corresponding, respective original image, each of the corresponding, respective original images being objects which the wearer sees in daily life or in a specific situation at the corresponding, respective long distance, intermediate distance, and short distance, the degrees of blur corresponding to magnitudes of aberrations of the spectacle lens; and
a sending unit that sends the information input via the input unit or a design parameter determined based on the information to a spectacle lens order receiving device.

13. A spectacle lens order receiving and designing device, comprising:
a receiving unit that receives information on a sensitivity to blur of a wearer or a design parameter determined based on the information, the information based on applying a blur sensitivity test by, for each of a long distance, an intermediate distance, and a short distance from a wearer to a corresponding, respective original image of original images, presenting a plurality of blurred images created by applying different degrees of blur based on convoluting through image processing luminances or color depths of points of the original image to the corresponding, respective original image and having the wearer see the blurred images of the corresponding, respective original image, each of the corresponding, respective original images being objects which the wearer sees in daily life or in a specific situation at the corresponding, respective long distance, intermediate distance, and short distance, the degrees of blur corresponding to magnitudes of aberrations of the spectacle lens; and
a design unit that designs a spectacle lens based on the information or the design parameter.

14. A spectacle lens order sending/receiving and designing system, comprising:
the spectacle lens order sending device according to claim 12; and
a spectacle lens order receiving device comprising a receiving unit that receives information on a sensitivity to blur of a wearer or a design parameter determined based on the information, the information based on applying a blur sensitivity test by, for each of a long distance, an intermediate distance, and a short distance from a wearer to a corresponding, respective original image of original images, presenting a plurality of blurred images created by applying different degrees of blur to the corresponding, respective original image and having the wearer see the blurred images of the corresponding, respective original image, each of the corresponding, respective original images being objects which the wearer sees in daily life or in a specific situation at the corresponding, respective long distance, intermediate distance, and short distance, and a design unit that designs a spectacle lens based on the information or the design parameter, the degrees of blur corresponding to magnitudes of aberrations of the spectacle lens.

15. A progressive power lens designed by the method for designing a spectacle lens according to claim 8.

16. A lens designed by the method for designing a spectacle lens according to claim 10.

17. The method for designing a spectacle lens according to claim 6, wherein:
the information on the sensitivity is information on whether or not the blurred image is acceptable for the wearer to see.

18. The method for designing a spectacle lens according to claim 6, wherein:
the plurality of blurred images are created by ray tracing of rays emitting from the original image and transmitting through refractors that generate different aberrations.

19. The method for designing a spectacle lens according to claim 6, wherein:
the plurality of blurred images are created based on a point spread function obtained by ray tracing in which rays emitting from a point at a predetermined distance from a retina transmit through a plurality of refractors generating different aberrations and are then incident on the retina.

20. The method for designing a spectacle lens according to claim 18, wherein:
the plurality of refractors generating different aberrations comprise spectacle lenses having at least one of different spherical powers, astigmatic powers, or astigmatic axes.

21. The method for designing a spectacle lens according to claim 6, wherein:
the wearer is wearing at least one corrective lens that provides a corrected visual acuity of the wearer while the wearer sees at least one blurred image.

22. The method for designing a spectacle lens according to claim 6, wherein:
a target aberration of a progressive power lens is set based on the information on the sensitivity.

23. The method for designing a spectacle lens according to claim 6, wherein:
based on the information on the sensitivity, a target extent of a range in which an astigmatism is small can be set in at least two regions selected from a distance zone, an intermediate zone, and a near zone of a progressive power lens.

24. The method for designing a spectacle lens according to claim 6, wherein:
a target aberration at a peripheral portion of a lens is set based on the information on the sensitivity.

25. A method for manufacturing a spectacle lens, wherein:
a spectacle lens is designed by the method for designing according to claim 6 and manufactured.

26. A progressive power lens designed by the method for designing a spectacle lens according to claim 22.

27. A lens designed by the method for designing a spectacle lens according to claim 24.

* * * * *